United States Patent [19]

Arito et al.

[11] Patent Number: 5,239,025

[45] Date of Patent: Aug. 24, 1993

[54] STYRENE TYPE RESIN AND PRODUCTION METHOD THEREOF

[75] Inventors: Yuichi Arito; Kazuhiko Sho, both of Kanagawa, Japan

[73] Assignee: Asahi Kasei Kogyo Kabushiki Kaisha, Osaka, Japan

[21] Appl. No.: 542,777

[22] Filed: Jun. 25, 1990

[30] Foreign Application Priority Data

Jun. 30, 1989 [JP] Japan ............................ 1-166968
Jun. 30, 1989 [JP] Japan ............................ 1-166969
Mar. 20, 1990 [JP] Japan ............................ 2-68229

[51] Int. Cl.$^5$ .................... C08F 4/38; C08F 12/08; C08F 12/12
[52] U.S. Cl. .................... 526/228; 526/73; 526/227; 526/346; 526/347
[58] Field of Search .................... 526/73, 228

[56] References Cited

U.S. PATENT DOCUMENTS

| | | | |
|---|---|---|---|
| 3,585,176 | 6/1971 | Gerritsen | 526/73 |
| 3,884,766 | 5/1975 | Bir | 526/88 |
| 4,079,074 | 3/1978 | Sanchez | 526/228 |
| 4,129,703 | 12/1978 | Kamath | 526/73 |
| 4,129,704 | 12/1978 | Sanchez | 526/228 |

FOREIGN PATENT DOCUMENTS 59-93725  5/1984 Japan.
59-176320 5/1984 Japan.
63-32089  6/1988 Japan.

OTHER PUBLICATIONS

Derwent Publications Ltd., Abstract Nos. 85-041648/07, 85-052369/09, 85-058417/10, 85-233823/38, 84-031346/06 and 85-252596/41.

*Primary Examiner*—Joseph L. Schofer
*Assistant Examiner*—Fred Zitomer
*Attorney, Agent, or Firm*—Birch, Stewart, Kolasch & Birch

[57] ABSTRACT

A novel styrene type resin having excellent strength which comprises
(A) a unit represented by the formula

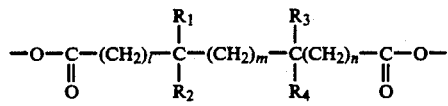

wherein
l and n are each an integer of 1 to 20;
m is an integer 0 to 5; and
$R_1$, $R_2$, $R_3$ and $R_4$ are each a hydrogen atom, an alkyl group having 1 to 5 carbon atoms, a cyclohexyl group or a phenyl group
and
(B) a unit represented by the formula

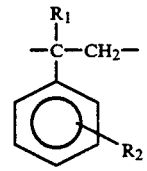

wherein
$R_1$ is a hydrogen atom or a methyl group and
$R_2$ is a hydrogen atom or an alkyl group having 1 to 5 carbon atoms and wherein the ratio of $S_A$ (namely, an amount of structural unit (A)) to $S_B$ (namely, an amount of structural unit (B)), $S_A/S_B$, is in the range of 0.00001 to 0.006; the resin having weight average molecular weight in the range of 200,000 to 600,000; and a total amount of styrene type monomers, styrene type dimers, styrene type trimers and a solvent of not more than 0.8% by weight.

3 Claims, 4 Drawing Sheets

STYRENE TYPE RESIN AND PRODUCTION METHOD THEREOF

BACKGROUND OF THE INVENTION

1. Field of the Invention

The present invention relates to a novel styrene type resin and its production method. More specifically it relates to a styrene type resin having excellent strength which is characterized in having a yield point and a break point in a tensile stress-strain test. These characteristics are due to the resin comprising a specific proportions of styrene type structural units and structural units having a long alkyl chain defined by specific structural formula and due to the restriction of the total amount of styrene type monomer, styrene type dimer, styrene type trimer and polymerization solvent.

Further, this invention relates to a method of producing the above-mentioned resin in high productivity.

2. Description of the Prior Art

Styrene type resins have heretofore been used extensively as plastic materials for household articles, electric appliances, etc., due to excellence in transparency, moldability and modulus. Due to the recent price hike in raw materials, resins which are relatively low in cost are replacing high quality resins and demand is growing. Herewith improvement of styrene type resins in strength and moldability to diversify the usage and to enhance the productivity are now in public demand.

An increase of the average molecular weight is a publicly known method to obtain a styrene type resin having high strength. However, the increase of the average molecular weight deteriorates the moldability of the resin.

Although using a plasticizer is a well-known method to supplement moldability, the addition of a plasticizer deteriorates heat resistance, modulus and strength. There are some fields which require high speed molding to enhance the productivity. The improvement in strength and moldability by means of enlarging the average molecular weight and using a plasticizer alone can not respond to these fields.

Whereas in some fields, resins, e.g., for large-sized shaped article use, require strength and moldability considerably more than heat resistance and stiffness. While it is common practice to use a plasticizer, adding a plasticizer to a conventional styrene type resin causes deterioration in strength. Therefore, the practice does not necessarily satisfy the market demand. Since the addition of a plasticizer deteriorates the strength of a resin, a method to produce styrene type resins having strength which is sufficient to fulfill the market demand and having excellent moldability as well must be sought.

Many shaped articles produced by foaming styrene type resins are used for wrapping food. A styrene type resin having wide molding width at heat molding, namely, a styrene type resin having good elongation is in demand.

Japanese Patent Publication No. 61231/1987 discloses that minimizing the content of low molecular weight polymer components is efficient in improving the strength of styrene type resins. Further, Japanese Patent Applications Laid-open Nos. 8304/1985 and 13805/1985 disclose a method of producing a styrene type resin excellent in strength according to which the resin contains a high molecular weight polymer component which is produced by using a multifunctional organic peroxide of decomposition type at low temperature. It can be expected that the strength of the resin is improved by these methods to some extent, but it can not be expected that the brittle breaking pattern is changed.

In other words, in a tensile stress-strain test, the elongation is in direct proportion to the tensile stress until break and there is no yield point. The increase of molecular weight does not change this feature. For example, the area below the tensile stress-strain curve, which is a strength standard, changes only by few percents.

Even if a multifunctional organic peroxide of the low temperature decomposition type is employed, remarkable improvement of a styrene type resin in strength can not be expected unless a proper styrene type resin is produced by a proper method.

Further, polymerization temperature and final polymerization rate are low in the methods of Japanese Patent Application Laid-open Nos. 8304/1985 and 13805/1985. Therefore, a large quantity of styrene type dimer and styrene type trimer are produced because unreacted styrene type monomers are exposed to a high temperature at the recovery system. Further, a low molecular polymer with molecular weight of no more than 20,000 is produced in large quantity. As a result, breakage occurs without having a yield point in a tensile stress-strain test and strength improvement is not sufficiently high.

Japanese Patent Application Laid-open No. 1525175/1985 discloses the use of multifunctional organic peroxide of the decomposition type at low temperature in the copolymerization reaction of styrene and α-methyl styrene. However, expected improvement does not occur due to the employment of the polymerization condition of the above-mentioned official document. As stated so far, conventional styrene type resins have been improved in many ways, however, there is still no satisfactory change in the brittleness characteristic of these resins.

It is publicly known that the addition of an elastomer changes the pattern. It is a so-called impact resistant polystyrene. Transparency is one of the primary characteristics of styrene type resin, however this addition causes the resin to be opaque.

Further, it is publicly known that the addition of a copolymerizable second monomer to the styrene type monomer improves the strength and flow property. For example, AS resin is produced by reacting styrene with acrylonitrile and BAS resin is produced by reacting styrene with butyl acrylate. The first objects are accomplished for these styrene type resins by the addition, however, some of the characteristics of the resins are lost. AS resin is remarkably deteriorated in flow property and is worsened in color tone and BAS resin is remarkably deteriorated in heat resistance.

Copolymerized resins containing a second monomer have the defect of losing transparency while mixing with styrene type resin. Therefore, these resins can not be used under the same conditions as styrene type resins.

SUMMARY OF THE INVENTION

In view of these circumstances, the present inventors have thoroughly studied the matter and completed the present invention by finding a method to obtain a novel styrene type resin which is excellent in strength and which shows a yield point and a break point in a tensile stress-strain test. The resin of the present invention being different from conventional brittle resins, is obtained by introducing a specific amount of long alkyl chains into a styrene type polymer and by restricting the total amount of styrene type monomer, styrene type dimer, styrene type trimer and polymerization solvent in the styrene type resin to a value which is lower than a specific amount.

Figure 4:
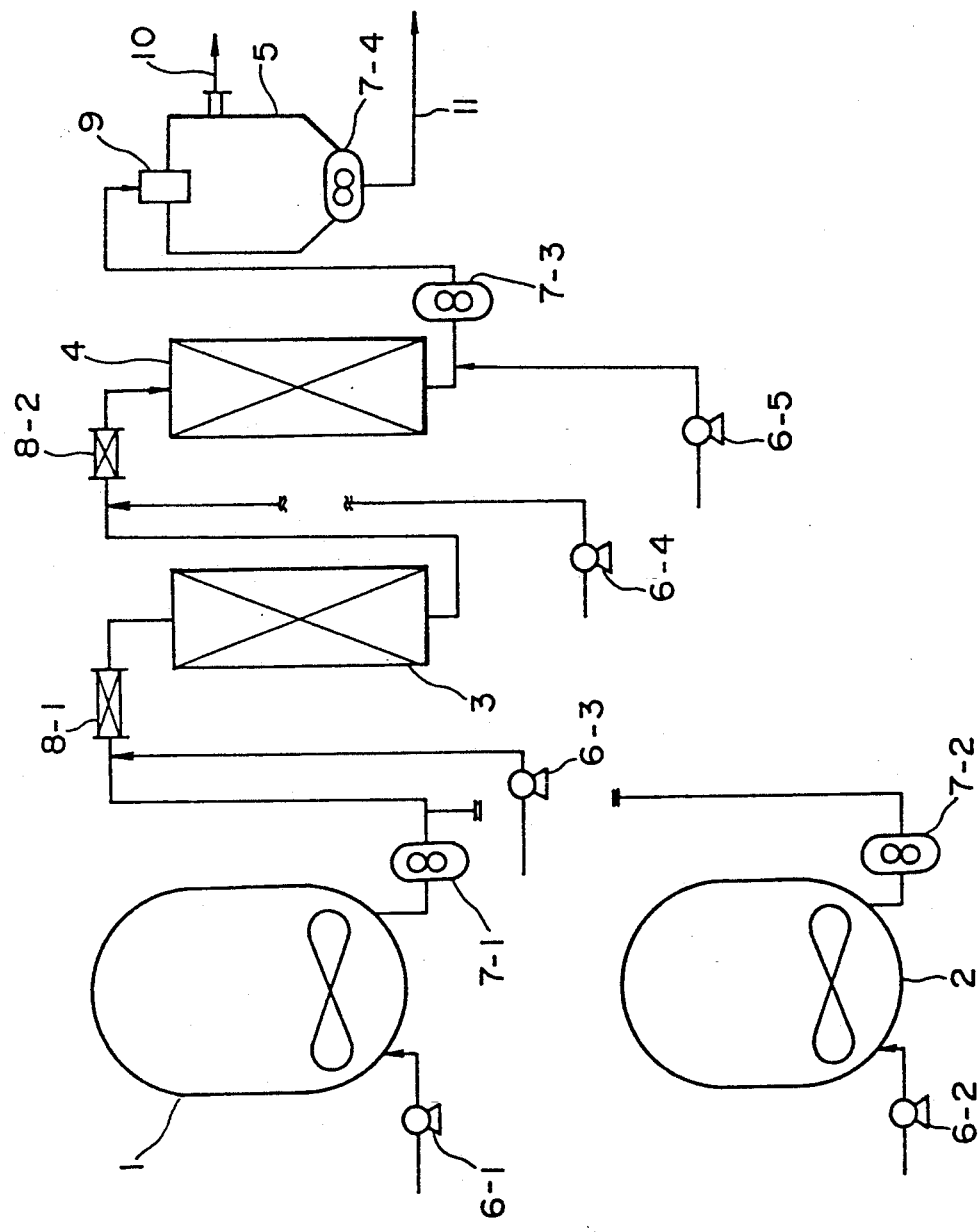
FIG. 4 is a figure of the equipment by which the example and comparative example in the present invention are carried out.

Reference numerals in FIG. 4 are as follows.

Reference numeral 1; polymerization reactor at the first step (complete mixing type reactor), reference numeral 2: polymerization reactor at the first step (complete mixing type reactor), reference numeral 3; polymerization reactor at the second step (with a built in static mixer), reference numeral 4: polymerization reactor at the second step (with a built in static mixer), reference numeral 5: recovery equipment, reference numerals 6-1 and 6-2: pump for feeding raw material solution, reference numerals 6-3 and 6-4: pump for feeding a solution containing the polymerization initiator, reference numeral 6-5; pump for feeding a solution containing additives, reference numerals 7-1, 7-2 and 7-3: transfer pump for the polymerization solution, reference numeral 7-4; transfer pump for the molten resin, reference numerals 8-1 and 8-2; static mixer, reference numeral 9: preheater (with a built in static mixer), reference numeral 10; vacuum line, reference numeral 11: transfer line for the molten resin.

DETAILED DESCRIPTION OF PREFERRED EMBODIMENTS

The novel styrene type resin of the present invention is characterised by comprising:

(A) a unit represented by the formula

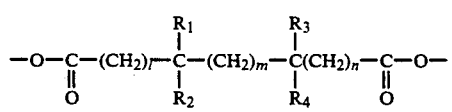

(wherein
l and n are each an integer 1 to 20:
m is an integer 0 to 5: and
R$_1$, R$_2$, R$_3$ and R$_4$ are each a hydrogen atom, an alkyl group having 1 to 5 carbon atoms, a cyclohexyl group or a phenyl group)
and
(B) a unit represented by the formula

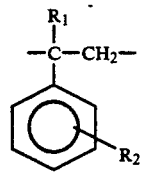

(wherein
R$_1$ is a hydrogen atom or a methyl group and
R$_2$ is a hydrogen atom or an alkyl group having 1 to 5 carbon atoms)
wherein the ratio of S$_A$ (namely, the amount of structural unit (A)) to S$_B$ (namely, the amount of structural unit (B)), S$_A$/S$_B$, is in the range of 0.00001 to 0.006; the resin having a weight average molecular weight in the range of 200,000 to 600,000; and the total amount of the styrene type monomer, the styrene type dimer, the styrene type trimer and the solvent is not more than 0.8% by weight.

Further, for bulk polymerization or solution polymerization, the present invention provides a unique production method for the styrene type resin. The characteristics of the method are: the first step of the polymerization process is conducted at a temperature in the range of 85° to 125° C. until the conversion ratio of the styrene type monomer reaches not less than 15% by weight after an organic peroxide of the low temperature decomposition type which includes at least three repeating units represented by the formula:

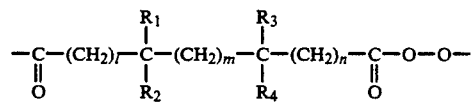

(wherein
l and n are each an integer 1 to 20:
m is an integer 0 to 5; and
R$_1$, R$_2$, R$_3$ and R$_4$ are each a hydrogen atom, an alkyl group having 1 to 5 carbon atoms, a cyclohexyl group or a phenyl group),
was added in an amount of 0.00015 to 0.10 parts by weight, in terms of the amount of active oxygen, per 100 parts by weight of the styrene type monomers: and the second step of the polymerization is conducted at a temperature which is not more than 170° C. until the concentration of the styrene type resin in the reaction solution reaches not less than 70% by weight.

Further, in the second step the polymerization process of the present invention which provides a production method for the styrene type resin is characterized in obtaining the resin by adding before or at least once during the polymerization an organic peroxide which decomposes to half when being kept at a temperature in the range of 80° to 140° C. for 10 hours, in an amount of 0.0002 to 0.006 parts by weight, in terms of the amount of active oxygen, per 100 parts by weight of the total styrene type monomer fed to the reaction system, more than once, and then polymerizing at not more than 170° C. until the concentration of the styrene type resin in the reaction solution reaches not less than 70% by weight.

Further, the present invention provides a styrene type resin excellent in moldability and strength, characterized in containing not more than 8 parts of a plasticizer per 100 parts of the above-mentioned styrene type resin.

Further, the present invention provides shaped articles having excellent strength which are molded from the above-mentioned two styrene type resins.

"Styrene type monomer" in the present invention refers to the following structural formula:

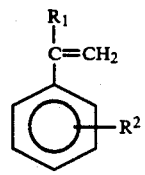

(wherein
R$_1$ is a hydrogen atom or a methyl group and
R$_2$ is a hydrogen atom or an alkyl group having 1 to 5 carbon atoms)

Examples of the styrene type monomers include styrene, α-methyl-styrene, vinyl styrene and p-methyl-styrene. These styrene type monomers can be used independently or as a mixture thereof. Further, mixtures of the above styrene type monomers and other vinyl monomers such as acrylic acid, methacrylic acid, methyl acrylate, methyl methacrylate and maleic anhydride may be used.

If the shape of shaped articles, and the conventional use thereof for instance, are taken into the consideration, the weight average molecular weight of styrene type resin should be in the range of 200,000 to 600,000, preferably, 200,000 to 500,000. When the weight average molecular weight is less than 200,000, improvement in strength is less than expected, even if the structural unit (A) is introduced, and controlling the molecular weight would be difficult in producing the styrene type resin. Therefore it is not preferable. When the molecular weight is more than 600,000, the productivity of the styrene type resin and moldability become extremely poor. Therefore its use is not practical.

It is necessary that $S_A/S_B$ is in the range of 0.00001 to 0.006, preferably, 0.00003 to 0.003. When $S_A/S_B$ is less than 0.00001, improvement in strength can not be expected. When the ratio, $S_A/S_B$, is more than 0.006, stiffness and heat resistance are lowered and the cost of the styrene type resins will rise because the polymerization initiator which is used in order to introduce the structural unit (A), is expensive and is therefore, not preferable.

It is necessary that the total amount of a styrene type monomer, a styrene type dimer, a styrene type trimer and a solvent is not more than 0.8% by weight. It is preferable that the amount is not more than 0.75% by weight. When the total amount is more than 0.8% by weight, the styrene type resin breaks without having a yield point in a tensile stress-strain test. Therefore improvement in strength is not attained. Further, it is preferable that the total amount of the styrene type monomer and the solvent is not more than 0.2% by weight. Preferably it is not more than 0.1% by weight. When the total amount of these is more than 0.2% by weight, the heat resistance of the styrene type resin is lowered, and undesirable phenomena such as mold-sweat would result when the resin is being molded, and is therefore, not preferable. It is also not preferable from a viewpoint of food hygiene.

The molecular weight range of the styrene type resin is not specifically limited. It is preferable that the amount of styrene type resin with a molecular weight of not more than 20,000 is not more than 5% by weight. More preferably it is not more than 3% by weight. When the amount of styrene type resin with a molecular weight of not more than 20,000 is more than 5% by weight, the styrene type resin easily breaks without having a yield point in the tensile stress-strain test even if long alkyl chains are introduced. It is preferable that the amount of styrene type resin with a molecular weight of not less than 2,000,000 is not less than 0.1% by weight. More preferably it is not less than 0.2% by weight. When the amount of styrene type resin with a molecular weight of not less than 2,000,000 is not less than 0.1% by weight, improvement in strength is lower than expected.

The molecular-weight distribution (ratio of average weight molecular weight to number average molecular weight) of the styrene type resin is not specifically limited. However, not more than 3.5 is preferable from a viewpoint of facilitating the method of production and moldability for molding.

Not more than 8 parts by weight of a plasticizer per 100 parts by weight of the styrene type resin is added. It is preferably not more than 6 parts by weight. When the amount of the plasticizer is more than 8 parts by weight, the heat resistance is extremely lowered. Therefore it is not preferable. Further, it results in phenomena such as mold deposit and mold sweat, whereby inferior goods would be produced therefrom, Therefore it is not preferable.

Examples of the plasticizer used in the present invention include mineral oils, liquid paraffin, higher fatty aids having 8 to 22 carbon atoms, metallic (for example, calcium, magnesium and zinc) salts of higher fatty acids having 4 to 22 carbon atoms, amides of ethylenebis fatty acids having 16 or 18 carbon atoms, higher aliphatic alcohol such as stearyl alcohol, dibutyl or dioctyl ester of adipic acid or sebacic acid monoglycerides, diglycerides or triglycerides of higher fatty acids having 8 to 22 carbon atoms, hydrogenated castor oil, hydrogenated tallow and dimethylpolysiloxane.

Examples of the structural unit (A) in the present invention include the following structural formulae:

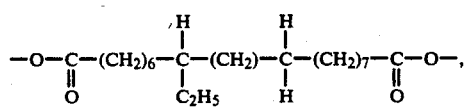

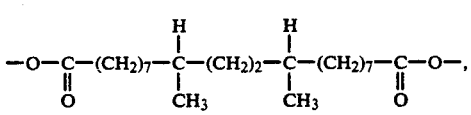

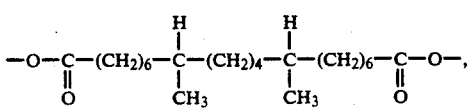

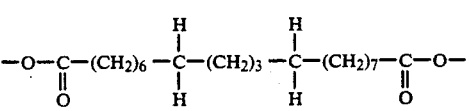

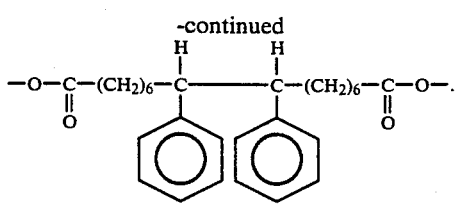

The present styrene type resin may have not less than two of the above mentioned structural units at random.

Examples of structural units (B) include the following structural formulae:

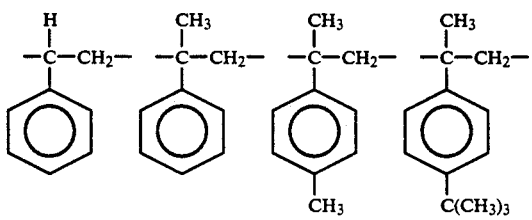

It is necessary that the organic peroxide of the low temperature decomposition type as the initiator is used in the first step of the polymerization process of the method of the present invention. The organic peroxide of the low temperature decomposition type has at least three repeating units shown by the above mentioned general formula (C). Preferably it has 5 to 30 repeating units. Examples of these organic peroxides include the following repeating units:

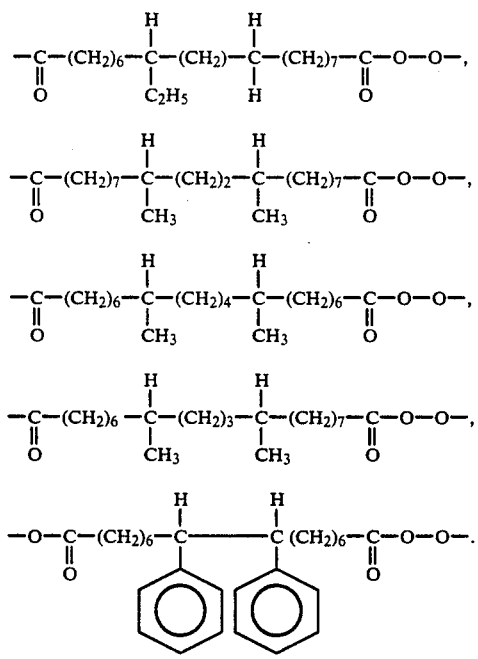

An organic peroxide of low temperature decomposition type which is a combination of not less than two of the above mentioned structural units at random can be also used.

These organic peroxide can be made according to the method disclosed in Japanese Patent Publication Nos. 32809/1988, 176320/1984 and 93725/1984.

The temperature at which these organic peroxides decompose to half when being kept at the temperature for 10 hours can be figured out by a method described in Japanese Patent Application 13805/1985.

It is preferable to use an organic peroxide which decomposes to half when being kept at a temperature in the range of 40° to 90° C. for 10 hours. An organic peroxide which decomposes to half when being kept at a temperature of less than 40° C. for 10 hours has the risk such as exploding while in storage and during handling. An organic peroxide which decomposes to half when being kept at a temperature more than 90° C. for 10 hours requires a long time period for the polymerization, which would therefore, cause a remarkable drop in productivity. Therefore, it is not preferable.

It is preferable to use 0.00015 to 0.10 parts by weight, in terms of the amount of active oxygen, of the organic peroxide the decomposition type at a low temperature per 100 parts by weight of the styrene type monomer. It is more preferable to use 0.0006 to 0.05 parts by weight. In the present invention, the term "amount of active oxygen" means the amount of active oxygen (—O—) of the peroxide bonds in the organic peroxides. When the amount of the organic peroxide is more than 0.1 parts by weight, controlling the reaction is difficult. Further, the production of styrene type resin of extremely high molecular weight (meaning not less than 1,000,000 of molecular weight) is not sufficient. As a result, improvement in strength is lowered. Further, expensive initiators would increase the cost of styrene type resins. Therefore it is not preferable. When the amount of the organic peroxide is less than 0.00015 parts by weight, the content of the long alkyl chains defined by the above mentioned general formula (A) is not sufficient. Therefore, a styrene type resin excellent in strength is not obtained. Further, the time necessary for the polymerization becomes longer, and therefore it causes a decrease in productivity.

The polymerization in the method of the present invention is carried out by means of feeding the mixture of material monomers, initiator, optionally solvent and other necessary additives into a reactor, and heating the mixture optionally under pressure or vacuum pressure according to bulk polymerization and solution polymerization used in the polymerization of conventional styrene type resins.

In the first step of the present invention, it is necessary that the polymerization is carried out at 85° to 125° C. until the conversion of styrene type monomers reaches at least 15% by weight. It is preferable that the polymerization is carried out at 85° to 120° C. until the conversion of styrene type monomers reaches at least 20% by weight. When the conversion is less than 15% by weight, the production of the styrene type resin having organic peroxide bonds in the polymer chains is lowered and the content of the long alkyl chains defined by above mentioned general formula (A) is remarkably lowered. Therefore it is not preferable. Further the production of styrene type resin of extremely high molecular weight is not sufficient. As a result, a resin of high strength is not obtained. A polymerization temperature of less than 85° C. is favorable for the production of styrene type resin of extremely high molecular weight, however, the reaction rate becomes extremely slow, and it causes a decrease in productivity. Therefore it is not preferable. When the polymerization temperature is more than 130° C., the production of styrene type resin of super high molecular weight is remarkably lowered, therefore it causes a decrease in productivity.

Further, the initiator of low temperature decomposition type of the polymerization rapidly decomposes, and therefore, the content of the alkyl chains having peroxide bonds defined by the above mentioned general formula (C) in the polymer chains is remarkably lowered. As a result, the content of structural unit (A) is insufficient, therefore, styrene type resin excellent in strength is not obtained.

At this step, the styrene type resin containing repeating units defined by the above mentioned general formula (C) in the polymer chains is obtained, and a reaction solution containing polymers of extremely high molecular weight is produced.

After the first step of the polymerization, the polymerization proceeds until the polymer concentration in the reaction solution reaches preferably not less than 40 to 55% by weight. The polymerization temperature at this time is not specifically limited, however, the range of 100° to 140° C. is preferable. At this time, styrene type monomers or a polymerization solution polymerized in another reactor may be added, and further polymerization may be conducted. Further, initiators can be added and the polymerization can be conducted.

The polymerization temperature in the second step depends on the molecular weight of the styrene type resins which should be produced. However, whatever molecular weight of the styrene type resins should be produced, it is necessary that the polymerization is conducted at not more than 170° C., preferably, not more than 160° C. When the polymerization is conducted at more than 170° C., a lot of styrene type dimer, styrene type trimer and styrene type resin with low molecular weight is produced, therefore, no effect of improvement can be expected. When the desired molecular weight can not be prepared only by controlling the polymerization temperature, controlling of the amount of the polymerization solvent, the amount of the molecular weight modifier and the like is necessary.

The polymerization temperature is more preferably in the range of 130° to 160° C. When the polymerization temperature is not more than 130° C., peroxide bonds containing long alkyl chains in the styrene type polymer chains which are produced at the first step do not decompose. They decompose in the recovery system. As a result, production of a styrene type resin having long alkyl chains defined by the above mentioned general formula (A), introduced into the styrene type polymer chains, is lowered. Therefore it is not preferable.

It is necessary that the polymerization is conducted until the styrene type resin concentration in the polymerization solution at the exit of the final reactor reaches not less than 70% by weight, preferably not less than 75% by weight. When the styrene type resin concentration is less than 70% by weight, a lot of styrene type dimer, styrene type trimer and styrene type resin with low molecular weight is produced in the recovery system where the reaction solution is exposed to high temperature. Further, the repeating units defined by the above mentioned general formula (A) are not fully introduced into the styrene type polymer chains. As a result, a styrene type resins having a yield point and a break point in the tensile stress-strain test in not obtained.

When the polymerization is carried out in the second step, preferably, a polymerization initiator should be added before or at least once during the polymerization. The amount of the polymerization initiator is in the range of 0.0002 to 0.006 parts, preferably in the range of 0.0005 to 0.005 parts, by weight, in terms of the amount of active oxygen, per 100 parts by weight of the total styrene type monomer which fed to the reaction system. When the amount of the added polymerization initiator is less than 0.0002 parts by weight, productivity is lowered especially when a styrene type resin with high molecular weight is produced. Therefore, it is not preferable. When the amount of the added polymerization initiator is more than 0.006 parts by weight, a lot of styrene type resins with low molecular weight are produced, and therefore, it causes decrease of strength. Further, controlling the polymerization reaction is difficult because of high concentration of polymerization initiator.

As addition method of the polymerization initiator, the polymerization initiator may be added independently or after the polymerization initiator was dissolved in the styrene type monomers or the polymerization solvent and the like.

As the type of polymerization initiator, an organic peroxide which decomposes to half when being kept at a temperature in the range of 80° to 140° C. for 10 hours is preferable. Representative example of these organic peroxides include peroxy ketals such as 2,2-bis(t-butylperoxy)butane, 2,2-bis(t-butylperoxy)octane, 1,1-bis(t-butylperoxy)3,3,5-trimethylcyclohexane, 1,1-bis(t-butylperoxy)cyclohexane, and n-butyl-4,4-bis(t-butylperoxy)pivalate: dialkyl peroxides such as 2,5-dimethyl-2,5-di(t-butylperoxy)hexane-3; peroxy esters such as t-butyl peroxy acetate, t-butyl peroxy-3,5,5-trimethyl hexanoate, t-butyl peroxy laurate, t-butyl peroxy benzoate, di-t-butyl diperoxy isophthalate, 2,5-dimethyl-2,5-di(benzolperoxy)hexane, and t-butyl peroxy isopropylcarbonate; ketone peroxides such as methylethyl ketone peroxide and cyclohexanone peroxide and hydroperoxides such as di-isopropylbenzene hydroperoxide p-methane hydroperoxide. When the temperature at which the organic peroxide decomposes to half when being kept at the temperature for 10 hours is less than 80° C., the decomposition reaction occurs only for a short time, and therefore, the radical concentration locally rises. Accordingly styrene type resins with low molecular weight are produced. Therefore it is not preferable. When the temperature at which the organic peroxide decomposes to half when being kept at the temperature for 10 hours is more than 140° C., the organic peroxides are not completely consumed in the reactor and remain to the recovery process where the organic peroxides are exposed to a high temperature. Accordingly styrene type resins with low molecular weight are produced and cutting of molecular bonds occurs at the recovery process. It causes deterioration of product quality. Therefore it is not preferable.

The polymerization solution which descharged the final reactor is sent to the recovery process which is used in bulk polymerization method or solution polymerization method of the conventional styrene type resins, is volatilized and pelletized.

The polymerization of the present invention is carried by the method of either batch polymerization or continuous polymerization. The kind of reactor used in the polymerization is not specially limited. Specially in the batch polymerization method, if only the reactor has enough stirring power, any reactor can be used.

In the continuous polymerization method, the use of the following reactors is preferable. As the polymerization reactor at the first step of the polymerization process, well known reactors such as the complete mixing type reactor and tube type reactor can be used. Further, several reactors arranged in parallel or in line can be used.

As the polymerization reactor at the second step of polymerization process, a reactor which gives the polymerization solution a flow pattern close to plug flow is preferable. As these reactors, a horizontal biaxial reactor having space part, a reactor with a built-in static mixer and a stirring type column reactor can be used. The combination of these reactors can be used. Specially a reactor with a built-in static mixer or a horizontal biaxial reactor are preferable. Examples of these reactors are HTR made by HITACHI SEISAKUSHO, SMR made by SULZER company and a reactor with a built-in SMX made by SULZER company. When a reactor which gives the polymerization solution a flow pattern close to complete mixing is used, controlling the polymerization reaction becomes difficult because the mixing characteristic and capacity of removing heat deteriorate as conversion of styrene type monomers becomes high. As a result, a lot of styrene type resins with low molecular weight are produced. Therefore it is not preferable. Further in case of the production by a continuous polymerization method, when a solution containing a polymerization initiator is added to the polymerization solution at the second step of the process, it is preferable that a static mixer as a mixer is used. Example of static mixers are a static mixer of KENIKS type and a static mixer of SULZER type. When a dynamic mixer such as a complete mixer of agitating blades type is used, the shearing force of stirring causes overheating locally. Accordingly styrene type resins with low molecular weight are produced and cutting of molecular bonds occurs. It causes deterioration of the product quality. Therefore it is not preferable. When the initiator is added between inlet and outlet of the horizontal biaxial reactor, the solution containing the polymerization initiator may be dropped only on the surface of the reaction solution.

Time for uniform mixing is not specially limited. However, time for uniform mixing is preferably within 30 minutes, more preferably within 15 minutes. A long period of time for uniform mixing causes that high concentration of the polymerization initiator exists locally for long time. Accordingly the styrene type resins with low molecular weight are produced, it causes decrease of strength. And therefore, effect of improvement can not be expected. Therefore it is not preferable.

The recovery equipment is not specially defined. The equipment which is generally used for production of styrene type resin can be used. Preferably the falling strand type can be used. Recovery can be conducted by one recovery equipment or by several recovery equipments.

As the heat exchanger, shell and tube type and double tubes type with built-in static mixer are preferable. These heat exchangers can be fitted up outside or inside of the recovery equipment.

Operation condition of the heat exchanger is not specially limited. However the residence time is within 15 minutes, preferably within 10 minutes. When the residence time is long, styrene type dimer, styrene type trimer and styrene type resin with low molecular weight are easily produced, and therefore, improvement in strength can not expected. Volatilization temperature at the recovery equipment depends on the molecular weight of the styrene type resin which is produced. However, the volatilization temperature is 200° C. to 260° C., preferably, 200° C. to 250° C. When the volatilization temperature is more than 260° C., styrene type dimer, styrene type trimer and styrene type resin with low molecular weight are produced. Therefore it is not preferable. Cutting of molecular bonds occurs and causes deterioration of product quality. Therefore it is not preferable. When the volatilization temperature is less than 200° C., it is difficult to remove unreacted styrene type monomers and polymerization solvent. Therefore it is not preferable. In order to raise the removal efficiency of unreacted styrene type monomers and polymerization solvent, the general method such as adding water, carbon dioxide and the like can be used. As other recovery equipments, a vented, multiple-stage, single-screw extruder or a vented, multiple-stage, twin-screw extruder can be used. As operation condition, it is necessary that the condition which does not cause deterioration of quality is set.

Polymerization solvent is not specially limited. However, toluene, xylene, ethylbenzene and the like preferably can be used.

At any time between the end of polymerization reaction and recovery of unreacted monomers and/or solvent, or between recovery of unreacted monomers and/or solvent and pelltetizing, conventional additives such as a antioxidant, a lubricant, a plasticizer and a colorant can be blended.

Examples of the antioxidants include hindered phenols, hindered bisphenols and hindered trisphenols such as 2,6-di-t-butyl-4-methylphenol and stearyl-$\beta$-(3,5,t-hydroxylphenyl)propionate and phosphoric chemical compounds such as tris(2,5-di-t-butylphenyl)phosphate and 4,4-butylidene-bis-(3-methyl-6-t-butyl-butyl-phenyl-di-tridecyl)phosphate.

Further, the styrene type resin of the present invention and other type of styrene type resins are mixed and can be used.

The styrene type resin of the present invention can be molded to many kinds of shaped articles by publicly known methods which are used for general thermoplastic resins, such as a injection molding method, a vacuum forming method, a extrusion molding method and a compression molding method.

After the styrene type resin of the present invention was molded to a film, a biaxial oriented film, a sheet, a foamed sheet and foamed materials, they are molded to the desired shaped articles.

In order to improve the surface characteristic of the obtained styrene type resin shaped articles, specially the film, the sheet and the foamed materials, antistatic agents and lubricants such as silicone may be coated on the surface.

Application is not specifically limited to shaped articles. Examples of application include the window of a cassette for video tape recorders, audio tape cassette halves, audio tape cassette cases, an audio tape cassette window, a container box of paper for copy machines, the cover of a container box for paper, a catch plate for copy papers, a beverage container, a goldfish bowl, a bird cage, a container tray for a business apparatus, a container case for floppy discs, a case for compact discs, toys, tableware, cape, a ball pen, a case for a container tableware, a laboratory dish for medical care and a foamed tray container for food.

In the present invention, the weight average molecular weight of styrene type resins is measured with gel permeation chromatography made by TOYO SODA MANUFACTURING CO., LTD. (HLC-802A) and column for gel permeation chromatography made by TOYO SODA MANUFACTURING CO., LTD. (use of two TSK-GEL-BMN6 column). Contents of the styrene type resin in each range of molecular weight are calculated by the proportion of area.

Styrene type monomers, styrene type dimers, styrene type trimers and solvent are measured by gas chromatography.

Conversion of the styrene type monomer and concentration of the styrene type resin in the reaction solution is examined by the following method. A fixed amount of reaction solution is weighed, and dried under vacuum of 5 mmHg at 200° C. for 30 minutes. The remaining styrene type resin is weighed.

Measurement of $S_A/S_B$ is carried out by the following method. The styrene type resin is dissolved in methylethylketone, in which the amount thereof is equivalent to ten times the amount of the styrene type resin. Next the styrene type resin is separated by slowly adding the same amount of methanol. The separated styrene type resin is dried under vacuum of 5 mmHg at 200° C. for 30 minutes. $C^{13}$ of the dried styrene type resin is measured by FT-NMR made by JAPAN ELECTRONIC OPTICAL LABORATORY COMPANY, JNM-GX400. The condition of measurement is as follows:

pulse width=9.2 μs: 45° pulse
data point=32768
repeated time=2.0 seconds
AD converter=16 bit
integrating number of times=30,000 to 10,000 number of times
sample concentration=20 WT %
solvent=1,1,2,2-tetrachloroethane-(d2)
sample tube diameter=10 mm
measurement temperature=120 ° C.

Peak based on the carbon of the methylene group of long alkyl chains appears at 29.4 ppm. Peak based on the methine group and the methylene group of the structural unit (B) appears at 39 to 50 ppm. $S_B$ means area of peak, based on the structural unit (B), which appears at 39 to 50 ppm. $S_A$ means area of peak, based on the structural unit (A), which appears at 29.4 ppm. Value of $S_A/S_B$ is calculated.

The following examples illustrate the present invention in more detail without placing any restriction on the scope of the invention.

Test methods of the physical properties of the example are as follows:

Melt flow rate: The method of ISO R1133 is adopted.

Vicat softening temperature: The method of ASTM D1525 is adopted.

Tensile strength: The method of ASTM D638 is adopted after the test piece was molded under the condition of molding temperature of 220° C. and injection press are of SSP (short shot point)+5 Kg/cm², it is allowed to stand in at a constant room temperature of 23° C. for 24 hours.

Pattern of tensile stress-strain curve: The pattern is judged by the chart of measurement of tensile strength.

Area under tensile stress-strain curve: The area is measured by using autograph AG-5000A made by SIMADZU CORPORATION in accordance with the method of ASTM D638.

Repeated impact strength: A test piece in the size of 5 cm×8.8 cm×2 mm is injection molded under the condition of molding temperature of 220° C. and molding press are of SSP (short shot point)+5 Kg/cm² and mold temperature of 60° C. The missile of 6.35 mm of curvature radius and weight of 150 g is dropped on the center of the test piece until a crack occurs. Number of times of the drop is examined. The fine adjustment of the height is carried out by setting the value of repeated impact strength to the value of 58 to 60 for the standard sample test piece made of a conventional polystyrene resin with a weight average molecular weight of 320,000 (STYRON by ASAHI KASEI KOUGYOU)

Missile impact strength of a gate part of a beverage cup:

A square test piece in the size of 2 cm×2 cm is cut from the molded beverage cup so that a gate part is at the center of the test piece and is fixed. The missile of 40 g of weight is dropped on the test piece. Impact strength is examined by examining the height at 50% breakage.

Compression strength of a top part of a beverage cup: A top part of a beverage cup is bent at the speed of 50 mm/min by tensile machine. Stress is examined when the top part is broken.

EXAMPLE 1

Polymerization of polystyrene is carried out by the equipment as shown in FIG. 4. The polymerization reactors 1 and 2 at the first step of the process are complete mixing type reactors having a capacity of 30 l, respectively. Therefore, the volume content of the reaction solution can be changed in the range of 5 l to 25 l.

The polymerization reactors 3 and 4 at the second step of the process are tube type polymerization reactors with a built-in static mixer. The capacity of the reactors is 20 l. In order to mix the polymerization solution and the polymerization initiator, the static mixers 8-1, 8-2 are placed at the inlet of the polymerization reactors 3 and 4, respectively. The capacity of the static mixers is 1 l. Gear pump 7-1, 7-2, 7-3 and 7-4 are placed at the outlet of the polymerization reactors 1 and 2 at the first step of the process and the polymerization reactor 4 at the second step of the process and recovery system. The pump 6-5 by which additives are fed and piping are placed between the outlet of the polymerization reactors 4 at the second step of the process and the gear pump 7-3.

Material solution containing 99.85 parts by weight of styrene and 0.15 parts by weight of an organic peroxide of the low temperature decomposition type containing 7 repeating units defined by formula:

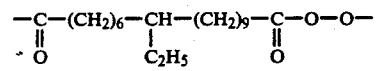

(temperature at which the above substance decomposes to half when being kept at the temperature for 10 hours: 64.4° C.: and amount of active oxygen: 0.04 g/1 g) is continuously fed to the polymerization reactor 1 at the first step of the process at a flow rate of 4.547 Kg/hr. The amount of solution is controlled so that the residence time in the reactor 1 is 5 hours. Polymerization is carried out at 105° C.

Material solution containing 85.034 parts by weight of styrene and 14.941 parts by weight of ethylbenzene and 0.025 parts by weight of 1, 1-bis(t-butylperoxy)cyclohexane (temperature at which the above substance decomposes to half when being kept at the temperature for 10 hours: 91° C.: and amount of active oxygen: 0.1231 g/1 g) is continuously fed to the polymerization reactor 2 at the first step of the process at a flow rate of 4.551 Kg/hr. The amount of solution is controlled so that the residence time in the reactor 2 would be 5 hours. Polymerization is carried out at 120° C. Conversion of styrene in the polymerization reactor 1 at the first step of the process is 28% by weight. Styrene resin concentration in the polymerization solution in the polymerization reactor 2 at the first step of the process is 48% by weight.

The polymerization solution coming out from the polymerization reactor 1 and polymerization solution coming out from the polymerization reactor 2 are mixed and the mixed solution is introduced to the static mixer 8-1. An ethylbenzene solution containing 1% by weight of 1,1-bis(t-butylperoxy)cyclohexane is continuously fed to the mixed solution at a flow rate of 90 g/hr. The polymerization solution mixed uniformly in the static mixer is introduced to the polymerization reactor 3 at the second step of the process. The polymerization is carried out at 130° C. in the polymerization reactor 3. The polymerization is carried out at 155° in the polymerization reactor 4. The concentration of the polymerization solution coming out from the polymerization reactor 4 is 76% by weight.

The polymerization solution coming out from the polymerization reactor 4 is introduced to the preheater 9. The preheater 9 has a built-in static mixer and its capacity is about 0.8 . After the polymerization solution was heated by the preheater until its temperature becomes 240° C., it is introduced to the recovery equipment whose temperature is kept at 240° C. The polymerization solution is volatilized under vacuum of 10 mmHg and pelletized.

EXAMPLE 2

The polymerization at the first step of the process is carried out under the same condition of example 1 except that the flow rate to the polymerization reactor 1 of the first step is 2.273 Kg/hr and the residence time at the polymerization reactor 1 is 6 hours. The conversion of styrene in the polymerization reactor 1 is 31% by weight. An ethylbenzene solution containing 1% by weight of 1,1-bis(t-butylperoxy)cyclohexane is continuously fed to the inlet of the static mixer 8-1 and the static mixer 8-2 at a flow rate of 40 g/hr respectively. The polymerization is carried out at 135° C. in the polymerization reactor 3 at the second step and at 155° C. in the polymerization reactor 4 at the second step. The concentration of the styrene resin in the polymerization solution coming out from the polymerization reactor 4 at the second step is 81% by weight. Afterwards, the styrene resin is obtained from the polymerization solution by the operation of the same condition of example 1. The physical properties of the styrene resin is evaluated. The result is shown in table 2.

EXAMPLE 3

The styrene resin is obtained by the operation of the same condition of example 2 except that the flow rate of the material solution to the polymerization reactor 1 at the first step and the reactor 2 at the first step is half of example 2 and the polymerization initiator is not added to the static mixers. The conversion of styrene in the polymerization reactor 1 is 31% by weight. The concentration of the styrene resin in the polymerization solution coming out from the polymerization reactor 4 at the second step is 77% by weight. The result of the properties evaluation is shown in table 2.

EXAMPLE 4

The polymerization at the first step of the process is carried out under the same condition of example 1 except that a material solution containing 99.956 parts by weight of styrene and 0.044 parts by weight of the organic peroxide of decomposition type at low temperature (temperature at which the above substance decomposes to half when being kept at the temperature for 10 hours: 64.4° C., amount of active oxygen: 0.04 g/1 g) containing 7 repeating units defined by the formula:

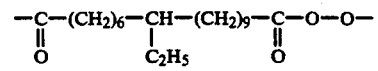

is continuously fed to the polymerization reactor 1 at the first step at a flow rate of 2.271 Kg/hr and the amount of the solution is controlled so that the residence time in the polymerization reactor 1 is 8 hours and the polymerization in the polymerization reactor 1 is carried out at 105° C. The conversion of styrene in the polymerization reactor 1 is 22% by weight. The polymerization at the second step of the process is carried out under the same condition of example 2 except that the polymerization temperature in the polymerization reactor 3 at the second step is 130° C. The concentration of the styrene resin in the polymerization solution coming out from the polymerization reactor 4 at the second step is 77% by weight. Afterwards, the styrene resin is obtained from the polymerization solution by the operation of the same condition of example 1. The result of the properties evaluation is shown in table 2.

EXAMPLE 5

The styrene resin is obtained by the operation of the same condition of example 4 except that an ethylbenzene solution containing 50% by weight of the mixture of styrene dimers and styrene trimers is continuously fed to the polymerization solution coming out from the polymerization reactor 4 at the second step at a flow rate of 25 g/hr. The result of the properties evaluation is shown in table 2.

The mixture of styrene dimers and styrene trimers, which is obtained by the following method is used. Methanol is added to the polymerization solution coming out from the polymerization reactor 4 at the second step, and then, the polymers are separated and removed from the polymerization solution. The mixture is separated and purified form the polymerization solution by distillation.

EXAMPLE 6

The styrene resin is obtained by the operation of the same condition of example 2 except that the organic peroxide of decomposition type at low temperature (temperature at which this substance decomposes to half when being kept at the tempeature for 10 hours: 65° C., amount of active oxygen: 0.04 g/1 g) containing 7 repeating units defined by the formula:

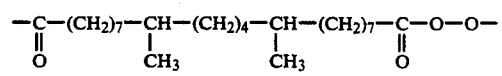

is continuously fed to the polymerization reaction 1 at first step. The result of the properties evaluation is shown in table 2. The conversion of styrene in the polymerization reactor 1 is 31% by weight. The concentration of the styrene resin in the polymerization solution coming out from the polymerization reactor 4 at the second step is 81% by weight.

EXAMPLE 7

The styrene resin is obtained by the operation of the same condition of example 2 except that the organic peroxide of decomposition type at low temperature (temperature at which this substance decomposes to half when being kept at the temperature for 10 hours: 64° C., amount of active oxygen: 0.04 g/1 g) containing the following 7 repeating units

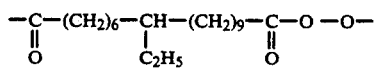

and 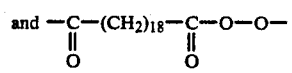

which is bonded in a proportion of 97 to 3 at random is continuously fed to the polymerization reactor 1 at first step.

The result of the properties evaluation is shown in table 2. The conversion of styrene in the polymerization reactor 1 is 30% by weight. The concentration of the styrene resin in the polymerization solution coming out from the polymerization reactor 4 at the second step is 80% weight.

EXAMPLE 8

The material solution containing 99.85 parts by weight of styrene and 0.15 parts by weight of the organic peroxide of decomposition type at low temperature (temperature at which the this substance decomposes to half when being kept at the temperature for 10 hours: 64.4° C., amount of active oxygen 0.04 g/1 g) containing 7 repeating units defined by the formula:

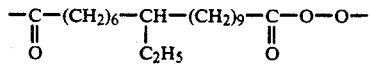

is continuously fed to the polymerization reactor 1 at the first step at a flow rate of 2.273 Kg/hr and the amount of the solution is controlled so that the residence time in the polymerization reactor 1 is 8 hours and the polymerization in the polymerization reactor 1 is carried out at 100° C.

The material solution containing 95.13 parts by weight of styrene and 4.84 parts by weight of ethylbenzene and 0.022 parts by weight of 1,1-bis(t-butylperoxy)cyclohexane (temperature at which this substance decomposes to half when being kept at the temperature for 10 hours: 91° C., amount of active oxygen: 0.1231 g/1 g) is continuously fed to the polymerization reactor 2 at the first step at a flow rate of 4.541 kg/hr and the amount of the solution is controlled so that the residence time in the polymerization reactor 1 is 5 hours and the polymerization in the polymerization reactor 1 is carried out at 115° C. The conversion of styrene in the polymerization reactor 1 is 24% by weight. The concentration of the styrene resin in the polymerization solution in the polymerization reactor 2 at the first step is 47% by weight.

The polymerization solution is introduced to the polymerization reactor at the second step. An ethylbenzene solution containing 1% by weight of 1,1-bis(t-butylperoxy)cyclohexane is continuously fed to the inlet of the static mixer 8-1 and the static mixer 8-2 at a flow rate of 40 g/hr respectively. The polymerization is carried out at 130° C. in the polymerization reactor 3 at the second step and at 140° C. in the polymerization reactor 4 at the second step. The concentration of the styrene resin in the polymerization solution coming out from the polymerization reactor 4 at the second step is 78% by weight. After the polymerization solution was heated in the preheater until the temperature of the polymerization solution became 250° C., the polymerization solution is introduced to the recovery equipment whose temperature is kept at 250° C., and is volatilized under vacuum of 10 mmHg and is pelletized. The result of the properties evaluation is shown in table 2.

EXAMPLE 9

The styrene resin is obtained by the operation of the same condition of example 8 except that the flow rates of the polymerization initiator solution fed to the inlet of the static mixer 8-1 and the static mixer 8-2 are 50 g/hr respectively and the polymerization temperature in the polymerization reactor 2 at the first step is 120° C. and the polymerization temperature in the polymerization reactor 4 at the second step is 135° C.

The concentration of the styrene resin in the polymerization solution in the polymerization reactor 2 at the first step is 52% by weight. The concentration of the styrene resin in the polymerization solution coming out from the polymerization reactor 4 at the second step is 82% by weight. The result of the properties evaluation is shown in table 2.

COMPARATIVE EXAMPLE 1

At the polymerization of the second step, the styrene resin is obtained by the operation of the same condition of example 2 except that the polymerization initiator solution is not fed to the inlet of the static mixer 8-1 and the static mixer 8-2 and the polymerization temperature in the polymerization reactor 3 at the second step is 130° C. and the polymerization temperature in the polymerization reactor 4 at the second step is 150° C.

The concentration of the styrene resin in the polymerization solution coming out from the polymerization reactor 4 at the second step is 63% by weight. The result of the properties evaluation is shown in table 2.

COMPARATIVE EXAMPLE 2

The styrene resin is obtained by the operation of the same condition of example 5 except that an ethylbenzene solution containing 50% by weight of the mixture of styrene dimers and styrene trimers is continuously fed to the polymerization solution coming out from the polymerization reactor 4 at the second step at a flow rate of 40 g/hr. The result of the properties evaluation is shown in table 2.

COMPARATIVE EXAMPLE 3

The styrene resin is obtained by the operation of the same condition of example 5 except that an ethylbenzene solution containing 50% by weight of the mixture of styrene dimers and styrene trimers is continuously fed to the polymerization solution coming out from the polymerization reactor 4 at the second step at a flow rate of 65 g/hr. The result of the properties evaluation is shown in table 2.

COMPARATIVE EXAMPLE 4

The styrene resin is obtained by the operation of the same condition of example 5 except that ethylbenzene solution containing 50% by weight of the mixture of styrene dimers and styrene trimers is continuously fed to the polymerization solution coming out from the polymerization reactor 4 at the second step at a flow rate of 80 g/hr. The result of the properties evaluation is shown in table 2.

COMPARATIVE EXAMPLE 5

The material solution containing 86.57 parts by weight of styrene and 13.40 parts by weight of ethylbenzene and 0.030 parts by weight of 1,1-bis(t-butylperoxy)cyclohexane (temperature at which this substance decomposes to half when being kept at the temperature for 10 hours: 91° C., amount of active oxygen: 0.1231 g/1 g) is continuously fed to the polymerization reactor 1 at the first step and the polymerization reactor 2 at the first step at a flow rate of 3.581 Kg/hr respectively, and the amount of the solution is controlled so that the residence time in the polymerization reactor 1 and the polymerization reactor 2 is 5 hours respectively. The polymerization in the polymerization reactor 1 and the polymerization reactor 2 is carried out at 115° C. The concentration of the styrene resin in the polymerization solution in the polymerization reactor 1 at the first step and the polymerization reactor 2 at the first step is 44% by weight.

The polymerization solution is introduced to the polymerization reactor at the second step. An ethylbenzene solution containing 1% by weight of 1,1-bis(t-butylperoxy)cyclohexane is continuously fed to the inlet of the static mixer 8-1 and the static mixer 8-2 at a flow rate of 40 g/hr respectively. The polymerization is carried out at 130° C. in the polymerization reactor 3 at the second step and at 155° C. in the polymerization reactor 4 at the second step. The concentration of the styrene resin in the polymerization solution coming out from the polymerization reactor 4 at the second step is 78% by weight. After the polymerization solution was heated in the preheater until the tempeature of the polymerization solution became 240° C., the polymerization solution is introduced to the recovery equipment whose temperature is kept at 240° C., and is volatilized under vacuum of 10 mmHg and is pelletized. The result of the properties evaluation is shown in table 2.

COMPARATIVE EXAMPLE 6

The material solution containing 99.85 parts by weight of styrene and 0.15 parts by weight of the organic peroxide of decomposition type at low temperature (temperature at which this substance decomposes to half when being kept at the temperature for 10 hours: 64.4° C., amount of active oxygen: 0.04 g/1 g) containing 7 repeating units defined by the formula:

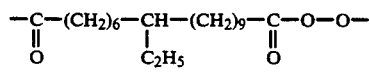

is continuously fed to the polymerization reactor 1 at the first step at a flow rate of 2.273 Kg/hr and the amount of the solution is controlled so that the residence time in the polymerization reactor 1 is 8 hours and the polymerization in the polymerization reactor 1 is carried out at 100° C.

The material solution containing 89.984 parts by weight of styrene and 10.00 parts by weight of ethylbenzene and 0.020 parts by weight of 1,1-bis(t-butylperoxy)cyclohexane (temperature at which this substance decomposes to half when being kept at the temperature for 10 hours: 91° C., amount of active oxygen: 0.1231 g/1 g) is continuously fed to the polymerization reactor 2 at the first step at a flow rate of 4.501 Kg/hr and the amount of the solution is controlled so that the residence time in the polymerization reactor 2 is 5 hours and the polymerization in the polymerization reactor 2 is carried out at 120° C. The conversion of styrene in the polymerization reactor 1 is 24% by weight. The concentraiton of the styrene resin in the polymerization solution in the polymerization reactor 2 at the first step is 51% by weight.

The polymerization solution coming out from the polymerization reactor 1 at the first step and the polymerization solution coming out from the polymerization reactor 2 at the first step are mixed, and the mixed solution is introduced to the static mixer. An ethylbenzene solution containing 1% by weight of 1,1-bis(t-butylperoxy)cyclohexane is continuously fed to the mixed solution at a flow rate of 40 g/hr. The polymerization solution mixed uniformly in the static mixer 8-1 is fed to the polymerization reactor 3 at the second step. The polymerization is carried out at 130° C. in the polymerization reactor 3 at the second step and at 180° C. in the polymerization reactor 4 at the second step. The concentration of the styrene resin in the polymerization solution coming out from the polymerization reactor 4 at the second step is 82% by weight.

After that, the styrene resin is obtained by the recovery equipment operation of the same condition of example 1. The result of the properties evaluation is shown in table 2.

COMPARATIVE EXAMPLE 7

The material solution containing 99.85 parts by weight of styrene and 0.006 parts by weight of the organic peroxide of decomposition type at low temperature (temperature at which this substance decomposes to half when being kept at the temperature for 10 hour: 64.4° C., amount of active oxygen: 0.04 g/1 g) containing 7 repeating units defined by the formula:

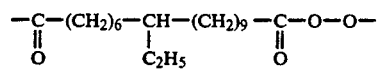

is continuously fed to the polymerization reactor 1 at the first step at a flow rate of 2.271 Kg/hr and the amount of the solution is controlled so that the residence time in the polymerization reactor 1 is 10 hours and the polymerization in the polymerization reactor 1 is carried out at 107° C.

The material solution containing 86.034 parts by weight of styrene and 13.941 parts by weight of ethylbenzene and 0.025 parts by weight of 1,1-bis(t-butylperoxy)cyclohexane temperature at which this substance decomposes to half when being kept at the temperature for 10 hours 91° C., amount of active oxygen: 0.1231 g/g) is continuously fed to the polymerization reactor 2 at the first step at a flow rate of 4.551 Kg/hr and the amount of the solution is controlled so that the residence time in the polymerization reactor 2 is 5 hours and the polymerization in the polymerization reactor 2 is carried out at 118° C. The conversion of styrene in the polymerization reactor 1 is 21% by weight. The concentration of the styrene resin in the polymerization solution in the polymerization reactor 2 at the first step is 51% by weight.

At the polymerization of the second step, the styrene resin is obtained by the operation of the same condition of comparative example 5 except that the polymerization temperature in the polymerization reactor 3 at the second step is 135° C. and the polymerization temperature in the polymerization reactor 4 at the second step is 150° C. The concentration of the styrene resin in the polymerization solution coming out from the polymerization reactor 4 at the second step is 75% by weight. The result of the properties evaluation is shown in table 2.

COMPARATIVE EXAMPLE 8

The material solution containing 94.43 parts by weight of styrene and 5.55 parts by weight of ethylbenzene and 0.020 parts by weight of 1,1-bis(t-butylperoxy)cyclohexane (temperature at which this substance decomposes to half when being kept at the temperature for 10 hours: 91° C., amount of active oxygen: 0.1231 g/1 g) is continuously fed to the polymerization reactor 1 at the first step and the polymerization reactor 2 at the first step at a flow rate of 3.601 Kg/hr respectively, and the amount of the solution is controlled so that the residence time in the polymerization reactor 1 and the polymerization reactor 2 is 6 hours respectively. The polymerization in the polymerization reactor 1 and the polymerization reactor 2 is carried out at 105° C. The concentration of the styrene resin in the polymerization solution in the polymerization reactor 1 at the first step and in the polymerization reactor 2 at the first step is 43% by weight.

The polymerization solution is introduced to the polymerization reactor at the second step. An ethylbenzene solution containing 1% by weight of 1,1-bis(t-butylperoxy)cyclohexane is continuously fed to the inlet of the static mixer 8-1 and the static mixer 8-2 at a flow rate of 40 g/hr respectively. The polymerization is carried out at 130° C. in the polymerization reactor 3 at the second step and at 140° C. in the polymerization reactor 4 at the second step. The concentration of the styrene resin in the polymerization solution coming out from the polymerization reactor 4 at the second step is 76% by weight. After the polymerization solution was heated in the preheater until the temperature of the polymerization solution became 250° C., the polymerization solution is introduced to the recovery equipment whose temperature is kept at 250° C., and is volatilized under vacuum of 10 mmHg and is pelletized. The result of the properties evaluation is shown in table 2.

COMPARATIVE EXAMPLE 9

The styrene resin is obtained by the operation of the same condition of example 9 except that the temperature in the polymerization reactor 2 at the first step is 115° C. and the polymerization initiator solution is not added at the polymerization of the second step and the polymerization temperature in the polymerization reactor 4 at the second step is 145° C.

The conversion of styrene in the polymerization reactor 1 at the first step is 24% by weight. The concentration of the styrene resin in the polymerization solution in the polymerization reactor 2 at the first step is 47% by weight. The concentration of the styrene resin in the polymerization solution coming out from the polymerization reactor 4 at the second step is 62% by weight. The result of the properties evaluation is shown in table 2.

Figure 2:
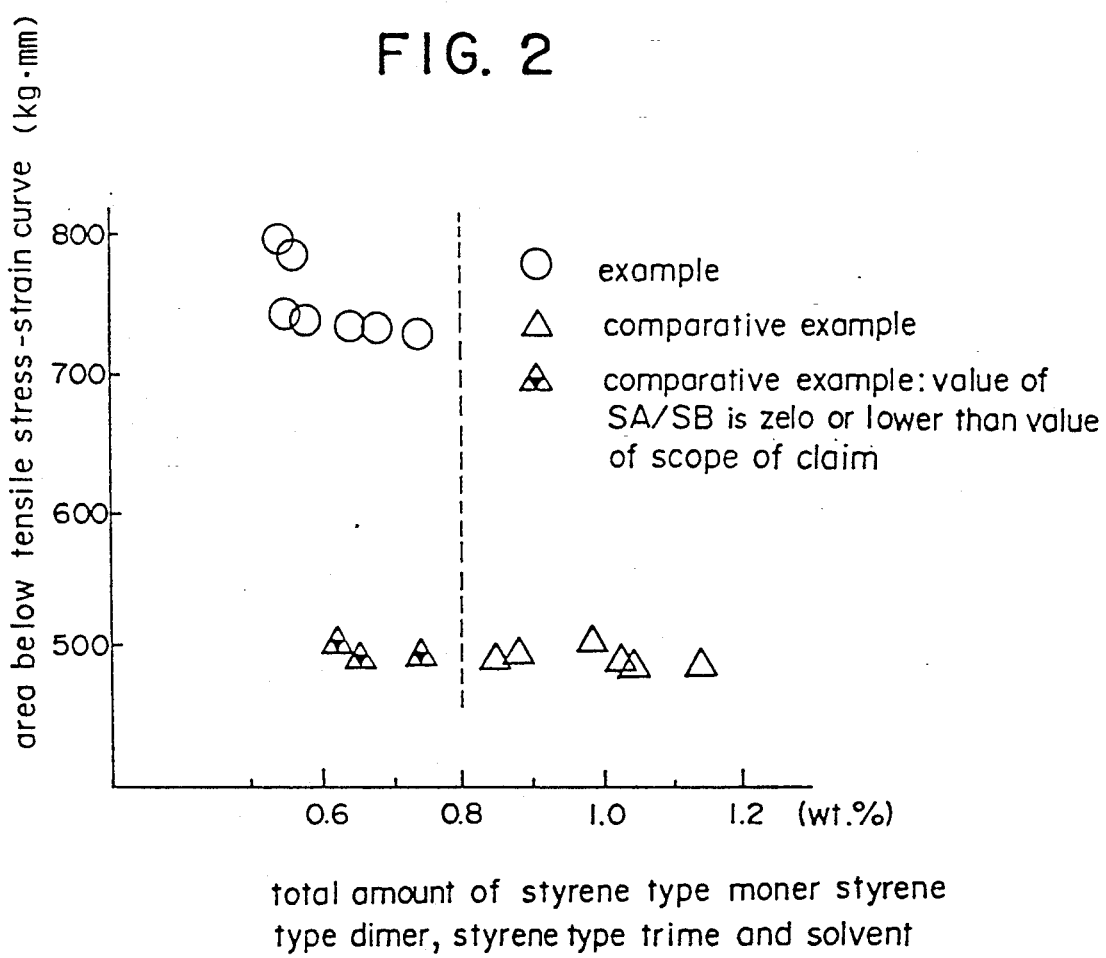
FIG. 2 is the relation figure of the total amount of styrene type monomer, styrene type dimer, styrene type trimer and solvent and the area below the stress-strain curve.

The relation between the total amount of styrene monomer, styrene dimer, styrene trimer and solvent and the area below the stress-strain curve is shown in FIG. 2. As can be seen from FIG. 2 that the styrene resin of the present invention having a specific long alkyl chain and not more than 0.8% by weight of the total amount of styrene monomer, styrene dimer, styrene trimer and solvent needs higher energy to destroy the test piece than a styrene resin having more than 0.8% by weight of the total amount of styrene monomer, styrene dimer, styrene trimer and solvent or a styrene resin not having a specific long alkyl chain. Further, table 2 shows that the styrene resin of the present invention has a high value of repeated impact strength and nearly same value of the properties except for strength such as flow properties and stiffness.

The styrene resin of the present invention remarkably improves only the strength without changing flow properties and stiffness and the like when the styrene resin of the present invention is compared with the conventional styrene resin.

As can be seen from table 1 the styrene resin is suitably produced by the polymerization method of the present invention. When the polymerization temperature at the second step is 180° C. (table 1, comparative example 6), a lot of styrene dimer, styrene trimer and styrene resin with low molecular weight are produced. Therefore, the styrene resin of the present invention is not obtained. When the concentration of styrene resin in the polymerization solution coming out from the final reactor is less than 70% by weight (table 1, comparative example 1, 9), a lot of styrene dimer and styrene trimer are produced.

Even if the polymerization initiator is not used at the second step, the styrene type resin of the present invention is obtained, however, the styrene type resin of the present invention is obtained in higher productivity by using a proper amount of polymerization initiator.

TABLE 1

| | first-step polymerization using decomposition-type initiator (*1) | | | second-step polymerization (*2) | | |
|---|---|---|---|---|---|---|
| | amount of initiator part by weight | polymerization temperature (°C.) | conversion % by weight | amount of initiator part by weight | polymerization temperature °C. | conversion % by weight |
| Example | | | | | | |
| 1 | 0.0060 | 105 | 28 | 0.0009 | 130–155 | 76 |
| 2 | 0.0060 | 105 | 31 | 0.0011 | 135–155 | 81 |
| 3 | 0.0060 | 105 | 31 | 0 | 135–155 | 76 |
| 4 | 0.0018 | 105 | 22 | 0.0011 | 130–155 | 77 |

TABLE 1-continued

| | first-step polymerization using decomposition-type initiator (*1) | | | second-step polymerization (*2) | | |
|---|---|---|---|---|---|---|
| | amount of initiator part by weight | polymerization temperature (°C.) | conversion % by weight | amount of initiator part by weight | polymerization temperature °C. | conversion % by weight |
| 5 | 0.0018 | 105 | 22 | 0.0011 | 130–155 | 77 |
| 6 | 0.0060 | 105 | 31 | 0.0011 | 135–155 | 81 |
| 7 | 0.0060 | 105 | 31 | 0.0011 | 135–155 | 81 |
| 8 | 0.0060 | 100 | 24 | 0.0010 | 130–140 | 78 |
| 9 | 0.0060 | 100 | 24 | 0.0013 | 130–135 | 82 |
| Comparative Example | | | | | | |
| 1 | 0.0060 | 105 | 31 | 0 | 130–150 | 63 |
| 2 | 0.0018 | 105 | 22 | 0.0011 | 135–155 | 77 |
| 3 | 0.0018 | 105 | 22 | 0.0011 | 135–155 | 77 |
| 4 | 0.0018 | 105 | 22 | 0.0011 | 130–155 | 77 |
| 5 | 0 | 115 | 44 | 0.0011 | 130–155 | 77 |
| 6 | 0.0060 | 100 | 24 | 0.00054 | 130–180 | 82 |
| 7 | 0.00024 | 107 | 21 | 0.0011 | 135–155 | 75 |
| 8 | 0 | 105 | 43 | 0.0010 | 130–140 | 76 |
| 9 | 0.0060 | 100 | 24 | 0 | 130–145 | 62 |

(*1) amount of initiator per 100 parts by weight of styrene anc calculated based on the amount of active oxygen.
(*2) amount of initiator per 100 parts by weight of styrene and calculated based on the amount of active oxygen.
Concentration of styrene resin is the concentration of styrene resin in the reaction solution coming out from the final reactor.

TABLE 2

| | average weight molecular weight $\times 10^{-4}$ | ratio of structural units $S_A/S_B$ | amount of low molecular weight materials (*1) | | | MFR g/10 min. | tensile stress-strain test curve | | tensile strength kg · mm | repeated impact strength (number of times) |
|---|---|---|---|---|---|---|---|---|---|---|
| | | | dimer trimer | SM EB | total | | pattern | area kg · mm | | |
| Example | | | | | | | | | | |
| 1 | 33.4 | 0.00025 | 0.584 | 0.062 | 0.646 | 1.5 | A | 737 | 553 | 115 |
| 2 | 32.9 | 0.00015 | 0.496 | 0.065 | 0.561 | 1.4 | A | 744 | 556 | 123 |
| 3 | 32.4 | 0.00016 | 0.627 | 0.066 | 0.693 | 1.4 | A | 736 | 557 | 118 |
| 4 | 32.1 | 0.00005 | 0.522 | 0.062 | 0.584 | 1.4 | A | 738 | 556 | 118 |
| 5 | 32.1 | 0.00005 | 0.678 | 0.063 | 0.741 | 1.5 | A | 731 | 552 | 112 |
| 6 | 32.2 | 0.00017 | 0.489 | 0.065 | 0.554 | 1.5 | A | 746 | 558 | 121 |
| 7 | 32.6 | 0.00013 | 0.511 | 0.066 | 0.577 | 1.4 | A | 739 | 556 | 120 |
| 8 | 37.6 | 0.00015 | 0.495 | 0.073 | 0.568 | 0.7 | A | 784 | 585 | 163 |
| 9 | 37.4 | 0.00013 | 0.482 | 0.558 | 0.558 | 0.7 | A | 791 | 586 | 169 |
| Comparative Example | | | | | | | | | | |
| 1 | 33.4 | 0.00016 | 0.811 | 0.075 | 0.886 | 1.3 | B | 496 | 550 | 65 |
| 2 | 32.1 | 0.00005 | 0.782 | 0. | 0.848 | 1.4 | B | 494 | 549 | 65 |
| 3 | 32.1 | 0.00005 | 0.950 | 0.067 | 1.017 | 1.5 | B | 493 | 552 | 64 |
| 4 | 32.1 | 0.00005 | 1.067 | 0.071 | 1.138 | 1.5 | B | 490 | 547 | 63 |
| 5 | 31.9 | 0 | 0.592 | 0.064 | 0.656 | 1.5 | B | 494 | 553 | 63 |
| 6 | 31.6 | 0.00010 | 0.972 | 0.074 | 1.046 | 1.5 | B | 488 | 550 | 67 |
| 7 | 32.3 | 0.0 (*3) | 0.657 | 0.067 | 0.724 | 1.4 | B | 491 | 551 | 64 |
| 8 | 36.8 | 0 | 0.539 | 0.074 | 0.613 | 0.8 | B | 502 | 587 | 95 |
| 9 | 37.2 | 0.00017 | 0.917 | 0.072 | 0.989 | 0.8 | B | 509 | 577 | 103 |

Figure 1:
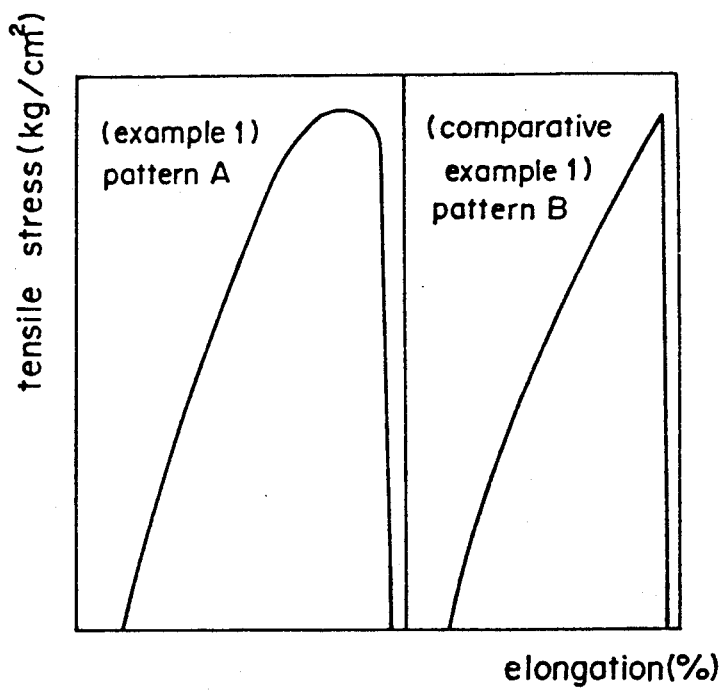
FIG. 1 is a pattern figure of the tensile stress-strain curve of the example and the comparative example in the present invention.

(*1) dimer and trimer of low molecular weight materials mean styrene dimer and styrene trimer respectively. SM and EB mean styrene and ethylbenzene.
(*2) pattern of tensile stress-strain test curve is referred to FIG. 1. Area means area below the tesnile stress-strain test curve.
(*3) peak appears at 29.4 ppmn, therefore, the presence of structural unit (A) can be confirmed. However, it is difficult to measure precisely. $S_A/S_B$ is less than 0.00001.

EXAMPLE 10

The styrene resin is obtained by the operation of the same condition of example 6 except that a mineral oil (SMOIL PS-260) is continuously fed to the polymerization solution coming out from the polymerization reaction at the second step at a flow rate of 120 g/hr. The result of properties evaluation is shown in table 3.

EXAMPLE 11

The styrene resin is obtained by the operation of the same condition of example 10 except that the flow rate of the mineral oil is 250 g/hr. The result of properties evaluation is shown in table 3.

EXAMPLE 12

The styrene resin is obtained by the operation of the same condition of example 10 except that the flow rate of the mineral oil is 350 g/hr. The result of properties evaluation is shown in table 3.

COMPARATIVE EXAMPLE 10

The styrene resin is obtained by the operation of the same condition of example 8 except that the mineral oil (SMOIL PS-260) is continuously fed to the polymerization solution coming out from the polymerization reactor at the second step at a flow rate of 130 g/hr. The result of properties evaluation is shown in table 3.

COMPARATIVE EXAMPLE 11

The styrene resin is obtained by the operation of the same condition of comparative example 10 except that the flow rate of the mineral oil is 250 g/hr. The result of properties evaluation is shown in table 3.

COMPARATIVE EXAMPLE 12

The styrene resin is obtained by the operation of the same condition of comparative example 10 except that the flow rate of the mineral oil is 350 g/hr. The result of properties evaluation is shown in table 3.

Figure 3:
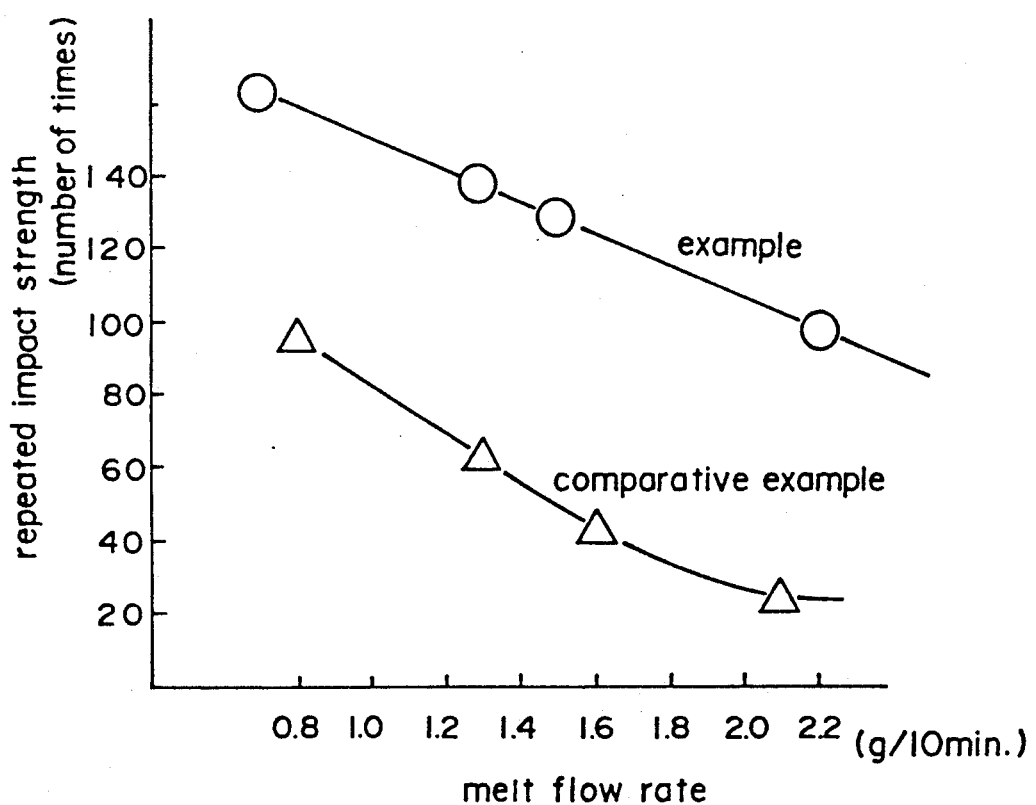
FIG. 3 is the relation figure of the repeated impact strength and the melt flow rate in the example and comparative example of the present invention.

The relation between flow property and repeated impact strength is shown in FIG. 3.

FIG. 3 shows that if a mineral oil is added to the styrene resin of the present invention having a specific long alkyl chain and not more than 0.8% by weight of the total amount of styrene monomer, styrene dimer, styrene trimer and solvent, strength is lowered, however, balance of flow properties and strength is more remarkably improved than in the styrene resins of the comparative example. The proportion of the change of heat resistance by addition of the mineral oil is the same as in the styrene resins of the comparative examples.

TABLE 3

|  | amount of mineral oil % by weight | ratio of structural unit SA/SB | amount of low molecular weight materials % by weight | melt flow rate g/10 min. | vicat softening temperature °C. | repeated impact (number of times) |
|---|---|---|---|---|---|---|
| Example |  |  |  |  |  |  |
| 10 | 1.6 | 0.00017 | 0.559 | 1.3 | 102 | 139 |
| 11 | 3.0 |  | 0.559 | 1.5 | 97 | 120 |
| 12 | 4.6 |  | 0.562 | 2.2 | 92 | 98 |
| Comparative Example |  |  |  |  |  |  |
| 10 | 1.5 | 0 | 0.603 | 1.3 | 102 | 63 |
| 11 | 3.1 |  | 0.600 | 1.6 | 96 | 42 |
| 12 | 4.4 |  | 0.606 | 2.1 | 93 | 24 | note: low molecular weight materials here are styrene monomer, styrene dimer, styrene trimer and ethylbenzene

EXAMPLE 13

The styrene resin obtained in example 2 is injection molded to a beverage cup by injection molding machine NEOMAT 350/120X (made by SUMITOMO JUKIKAI KOGYO) under the condition of cylinder temperature of 250° C. and injection pressure of 90 Kg/cm² and mold temperature of 45° C. Impact strength of the gate part of the beverage cup is measured. The result is shown in table 4.

EXAMPLE 14

The same experiment as in example 13 is carried out except for using the styrene resin obtained in example 3. The result is shown in table 4.

COMPARATIVE EXAMPLE 13

The same experiment as in example 13 is carried out except for using the styrene resin obtained in comparative example 1. The result is shown in table 4.

COMPARATIVE EXAMPLE 14

The same experiment as in example 13 is carried out except for using the styrene resin obtained in comparative example 1. The result is shown in table 4.

TABLE 4

|  | missile impact strength of gate part |
|---|---|
| Example |  |
| 13 | 935 g · cm |
| 14 | 920 |
| Comparative Example |  |
| 13 | 650 g · cm |
| 14 | 640 |

EXAMPLE 15

The styrene resin obtained in example 6 is injection molded to a beverage cup by injection molding machine SAICAP 480/150 (made by SUMITOMO JUKIKAI KOGYO) under the condition of cylinder temperature of 260° C. and injection pressure of 100 Kg/cm² and mold temperature of 45° C. Strength of a top part of the beverage cup is measured. The result is shown in table 5.

EXAMPLE 16

The same experiment as in example 15 is carried out except for using the styrene resin obtained in example 7. The result is shown in table 5.

COMPARATIVE EXAMPLE 15

The same experiment as in example 15 is conducted except for using the styrene resin obtained in comparative example 8. The result is shown in table 5.

COMPARATIVE EXAMPLE 16

The same experiment as in example 15 is conducted except for using the styrene resin obtained in comparative example 9. The result is shown in table 5.

TABLE 5

|  | compression strength of a top part of the beverage cup |
|---|---|
| Example |  |
| 15 | 2775 g |
| 16 | 2830 g |
| Comparative Example |  |
| 15 | 2030 g |
| 16 | 2300 g |

Practical strength of shaped articles which are made of the styrene resin of the present invention, having a specific long alkyl chain and not more than 0.8% by weight of the total amount of styrene monomer, styrene dimer, styrene trimer and solvent specially, the impact strength of gate part and the strength of the top part, of the beverage cup and the like is excellent.

What is claimed is:

1. A styrene type resin comprising:

(A) a unit represented by the formula

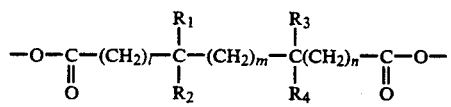

wherein l and n are each an integer of 1 to 20;

m is an integer 0 to 5; and $R_1$, $R_2$, $R_3$ and $R_4$ are each a hydrogen atom, an alkyl group having 1 to 5 carbon atoms, a cyclohexyl group or a phenyl group and (B) a unit represented by the formula

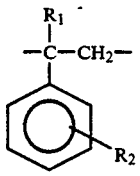

wherein $R_1$ is a hydrogen atom or a methyl group and $R_2$ is a hydrogen atom or an alkyl group having 1 to 5 carbon atoms and wherein the ratio of $S_A$ (namely, an amount of structural unit (A)) to $S_B$ (namely, an amount of structural unit (B)), $S_A/S_B$, is in the range of 0.00001 to 0.006; the resin having weight average molecular weight in the range of 200,000 to 600,000; an area under the stress-strain curve of over 509 Kg·mm, yield and breaking points in the tensile stress-strain test, and a total amount of styrene type monomers, styrene type dimers, styrene type trimers and a solvent of not more than 0.8% by weight.

2. The styrene type resin of claim 1, wherein said resin has an area under the stress-strain curve of not less than 731 Kg·mm, yield and breaking points in the tensile stress-strain test.

3. The styrene type resin of claim 1, wherein said resin has an area under the stress-strain curve of 731–791 Kg·mm, yield and breaking points in the tensile stress-strain test.

* * * * *